(12) United States Patent
Suzuki et al.

(10) Patent No.: US 9,029,288 B2
(45) Date of Patent: May 12, 2015

(54) CATALYST AND A MANUFACTURING METHOD THEREOF

(71) Applicant: Kabushiki Kaisha F.C.C., Hamamatsu-shi (JP)

(72) Inventors: Ryou Suzuki, Hamamatsu (JP); Shintaro Yagi, Hamamatsu (JP); Yusuke Ogata, Hamamatsu (JP); Sho Taniguchi, Hamamatsu (JP)

(73) Assignee: Kabushiki Kaisha F.C.C., Hamamatsu-Shi (JP)

( * ) Notice: Subject to any disclaimer, the term of this patent is extended or adjusted under 35 U.S.C. 154(b) by 0 days.

(21) Appl. No.: 14/021,909

(22) Filed: Sep. 9, 2013

(65) Prior Publication Data

US 2014/0005043 A1  Jan. 2, 2014

Related U.S. Application Data

(63) Continuation of application No. PCT/JP2012/056172, filed on Mar. 9, 2012.

(30) Foreign Application Priority Data

Mar. 10, 2011  (JP) .................................. 2011-052655

(51) Int. Cl.
 *B01J 23/44* (2006.01)
 *B01J 23/46* (2006.01)
 (Continued)

(52) U.S. Cl.
 CPC .............. *B01J 23/464* (2013.01); *B01J 21/066* (2013.01); *B01J 23/40* (2013.01); *B01J 23/44* (2013.01);
 (Continued)

(58) Field of Classification Search
 CPC .......... B01J 23/46; B01J 21/066; B01J 23/40; B01J 23/44; B01J 23/464; B01J 37/0207; B01J 21/04; C01B 3/38; B01D 53/945; B01D 2252/1023; B01D 2255/1025; B01D 2255/20715; B01D 2255/2092; Y02T 10/22
 USPC ....................................................... 502/333
 See application file for complete search history.

(56) References Cited

U.S. PATENT DOCUMENTS 4,904,633 A  2/1990  Ohata et al.
5,071,816 A  12/1991  Horiuchi et al.
(Continued)

FOREIGN PATENT DOCUMENTS

JP  H07-299360  11/1995
JP  H08-048502  2/1996
(Continued)

OTHER PUBLICATIONS

International Search Report dated May 16, 2012 of PCT Application No. PCT/JP2012/056172, filed on Mar. 9, 2012.

*Primary Examiner* — Colleen Dunn
*Assistant Examiner* — Haytham Soliman
(74) *Attorney, Agent, or Firm* — Knobbe Martens Olson and Bear LLP

(57) ABSTRACT

A catalyst can be manufactured using a method which can include preparing a first aqueous solution including zirconium, filling the pores of the porous alumina with the aqueous solution by a pore-filling method using the capillary phenomenon, forming a zirconia layer in the pores of the porous alumina, preparing a second aqueous solution including noble metals, filling the pores of the porous alumina with the second aqueous solution by a pore-filling method using the capillary phenomenon, and drying and baking the porous alumina to carry the noble metals in the pores of the porous alumina formed with a zirconia layer.

6 Claims, 3 Drawing Sheets

(51) Int. Cl.
    *B01J 21/06*     (2006.01)
    *B01J 23/40*     (2006.01)
    *B01J 37/02*     (2006.01)
    *B01D 53/94*     (2006.01)
    *B01J 21/04*     (2006.01)

(52) U.S. Cl.
    CPC ........... B01J 37/0207 (2013.01); B01D 53/945 (2013.01); *B01J 21/04* (2013.01); *B01D 2255/1023* (2013.01); *B01D 2255/1025* (2013.01); *B01D 2255/20715* (2013.01); *B01D 2255/2092* (2013.01); *Y02T 10/22* (2013.01)

(56) References Cited

U.S. PATENT DOCUMENTS

2003/0180197 A1 *   9/2003   Nunan ........................ 422/177
2010/0135879 A1     6/2010   Roesch et al.

FOREIGN PATENT DOCUMENTS

| | | |
|---|---|---|
| JP | 2007-098250 | 4/2007 |
| JP | 2007098250 A * | 4/2007 |
| JP | 2009-125688 | 6/2009 |

\* cited by examiner

US 9,029,288 B2

CATALYST AND A MANUFACTURING METHOD THEREOF

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

1. Field of the Inventions

The present disclosure relates to catalysts, for example, where noble metals can be carried in pores of a porous alumina, and a manufacturing method thereof.

2. Description of the Related Art

Emissions, such as hydrocarbon (HC) compounds, carbon monoxide (CO), and nitrogen oxides ($NO_x$), can be discharged from internal combustion engines of automobiles as exhaust gas. Methods for removing emissions contained in the exhaust gas can use an exhaust gas purifying catalyst as well as optimization of combustion conditions, such as air-fuel ratio in the engines, in order to reduce the amount of emissions in the exhaust gas.

A so-called "three way catalyst" has been used in which noble metals such as platinum (Pt), rhodium (Rh), and palladium (Pd) are carried on a carrier of porous metal oxides, such as alumina. For example, as disclosed in Japanese Application No. JP 07-299360 A, the three way catalyst oxidates CO and HC and reduces $NO_x$ to $N_2$. The three way catalyst acts as a catalyst at near the theoretical air-fuel ratio.

However, there are significant problems in using the catalysts of the prior art noted above. For example, exhaust gas of small, two stroke-cycle engines is so rich in unburned HC that it may be impossible to have sufficient exhaust gas purifying performance merely by diverting catalysts for four stroke-cycle engines to those for two stroke-cycle engines. In addition, since the exhaust gas of two stroke-cycle engines has extremely high temperatures, catalysts having high heat resistance are required. Thus, it is extremely difficult to have a catalyst suited for characteristics of various kinds of engines.

SUMMARY

Several aspects of the present disclosure provide for a catalyst and a manufacturing method thereof which can improve the heat resistance of the catalyst, thereby easily obtaining exhaust gas purifying characteristics suited for various kinds of engines.

In some embodiments, a method for manufacturing a catalyst in which noble metals are carried in pores of a porous alumina can comprise a first aqueous solution preparing step for preparing aqueous solution including zirconium, a first pore-filling step for filling the pores of the porous alumina with the aqueous solution obtained in the first aqueous solution preparation step by a pore-filling method using the capillary phenomenon caused in the pores of the porous alumina, a first drying and baking step for forming a zirconia layer in the pores of the porous alumina by drying and baking the porous alumina of which pores being filled with the aqueous solution in the first pore-filling step, a second aqueous solution preparing step for preparing aqueous solution including noble metals, a second pore-filling step for filling the pores of the porous alumina with the aqueous solution obtained in the second aqueous solution preparation step by a pore-filling method using the capillary phenomenon caused in the pores of the porous alumina, and a second drying and baking step for carrying the noble metals in the pores of the porous alumina formed with zirconia layer by drying and baking the porous alumina of which pores being filled with the aqueous solution in the second pore-filling step.

In some embodiments, the noble metals in the second aqueous solution preparing step can comprise palladium (Pd) and rhodium (Rh), and they can be simultaneously carried in the pores of the porous alumina.

In some embodiments, the weight ratio of Pd and Rh in the aqueous solution prepared in the second aqueous solution preparation step can be about 20:1, and the content of Pd and Rh in the second pore-filling step relative to the porous alumina can be about 1-5 percentage by weight (wt. %).

In some embodiments, a catalyst in which noble metals are carried in pores of porous alumina can be manufactured by a method comprising a first aqueous solution preparing step for preparing aqueous solution including zirconium, a first pore-filling step for filling the pores of the porous alumina with the aqueous solution obtained in the first aqueous solution preparation step by a pore-filling method using the capillary phenomenon caused in the pores of the porous alumina, a first drying and baking step for forming a zirconia layer in the pores of the porous alumina by drying and baking the porous alumina of which pores being filled with the aqueous solution in the first pore-filling step, a second aqueous solution preparing step for preparing aqueous solution including noble metals, a second pore-filling step for filling the pores of the porous alumina with the aqueous solution obtained in the second aqueous solution preparation step by a pore-filling method using the capillary phenomenon caused in the pores of the porous alumina, and a second drying and baking step for carrying the noble metals in the pores of the porous alumina formed with zirconia layer by drying and baking the porous alumina of which pores being filled with the aqueous solution in the second pore-filling step.

In some embodiments, the noble metals in the second aqueous solution preparing step can comprise palladium and rhodium, and can be simultaneously carried in the pores of the porous alumina.

In some embodiments, the weight ratio of palladium and rhodium in the aqueous solution prepared in the second aqueous solution preparation step can be about 20:1, and the content of Pd and Rh in the second pore-filling step relative to the porous alumina can be about 1-5 percentage by weight (wt. %).

DETAILED DESCRIPTION

Figure 1:
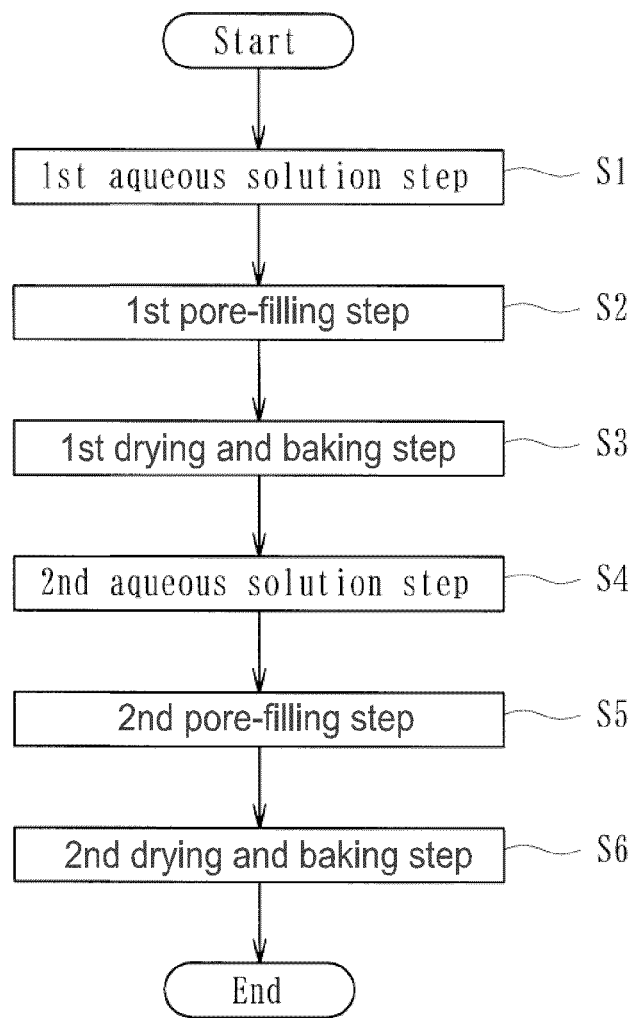
FIG. 1 illustrates a flowchart showing an embodiment of a method for manufacturing a catalyst of the present disclosure.

Several embodiments of the present disclosure are described below in detail with reference to accompanied drawings.

The catalyst of the present disclosure can be used for purifying exhaust gas discharged from two stroke-cycle engines, such as engines for motorcycles and for general purposes, and can be manufactured through a first aqueous solution preparing step S1, a first pore-filling step S2, a first drying and baking step S3, a second aqueous solution preparing step S4, a second pore-filling step S5, and a second drying and baking step S6. As shown in FIG. 2(a), the catalyst of the present disclosure can comprise porous alumina, which can be an alumina carrier or catalyst carrier. Noble metals such as, for example palladium and rhodium, can be carried in pores of the porous alumina A.

The first aqueous solution preparing step S1 can involve preparing an aqueous solution including zirconium. For example, an aqueous solution of zirconyl nitrate may be used. The first pore-filling step S2 can involve filling pores of a porous alumina with the aqueous solution obtained in the first aqueous solution preparing step S1 by a pore-filling method. The pore-filling method can utilize the capillary phenomenon in the pores of the porous alumina A. As shown in FIG. 2(b), the aqueous solution including zirconium B can be filled into the pores of the porous alumina A by the first pore-filling step S2.

In some embodiments, the pore-filling method used in the first and second pore-filling steps S2 and S5 can be a method in which a whole volume of the pores of the alumina carrier (catalyst carrier) A is measured. Following, the pores of the alumina carrier (catalyst carrier) A can be filled using the capillary phenomenon with an aqueous solution of the same volume as the measured whole volume of the pores. This can be the aqueous solution obtained in the first aqueous solution preparing step S1 in the present disclosure. Further, zirconium can be added by mixing and agitating the solution and zirconium. Since the aqueous solution including zirconium B can be filled into the pores of the alumina carrier (catalyst carrier) A by the pore-filling method, it is possible to efficiently layer zirconia in the pores of the alumina carrier A.

The first drying and baking step S3 can involve forming a zirconia layer B' in the pores of the porous alumina A by drying and baking the porous alumina A filled with the aqueous solution B in the first pore-filling step S2. That is, zirconia layers B', such as $ZrO_2$—$Al_2O_3$, can be formed. For example, the pore walls can be covered by zirconia layers B', as shown in FIG. 2(c) by drying the alumina carrier (catalyst carrier) A after the first pore-filling step S2 and then by baking it at 1100° C. for 3-10 hours.

After the first drying and baking step S3, the wall surfaces of pores of the porous alumina (catalyst carrier) A can be covered by zirconia layers B' ($ZrO_2$—$Al_2O_3$) as shown in FIG. 2(c). The porous alumina A, after the first drying and baking step S3, can have a BET specific surface of about 50 m²/g, even after the zirconia layer B' has been formed, and thus it is possible to fill the pores with aqueous solution at a later step (second pore-filling step S5).

The second aqueous solution preparing step S4 can involve preparing an aqueous solution including noble metals C'. In the present disclosure, the noble metals can comprise palladium and rhodium. That is, platinum may not be included in the noble metals. This can make it possible to simultaneously carry Pd and Rh in the pores of the porous alumina (catalyst carrier) at a later step (second drying and baking step S6).

Figure 2:
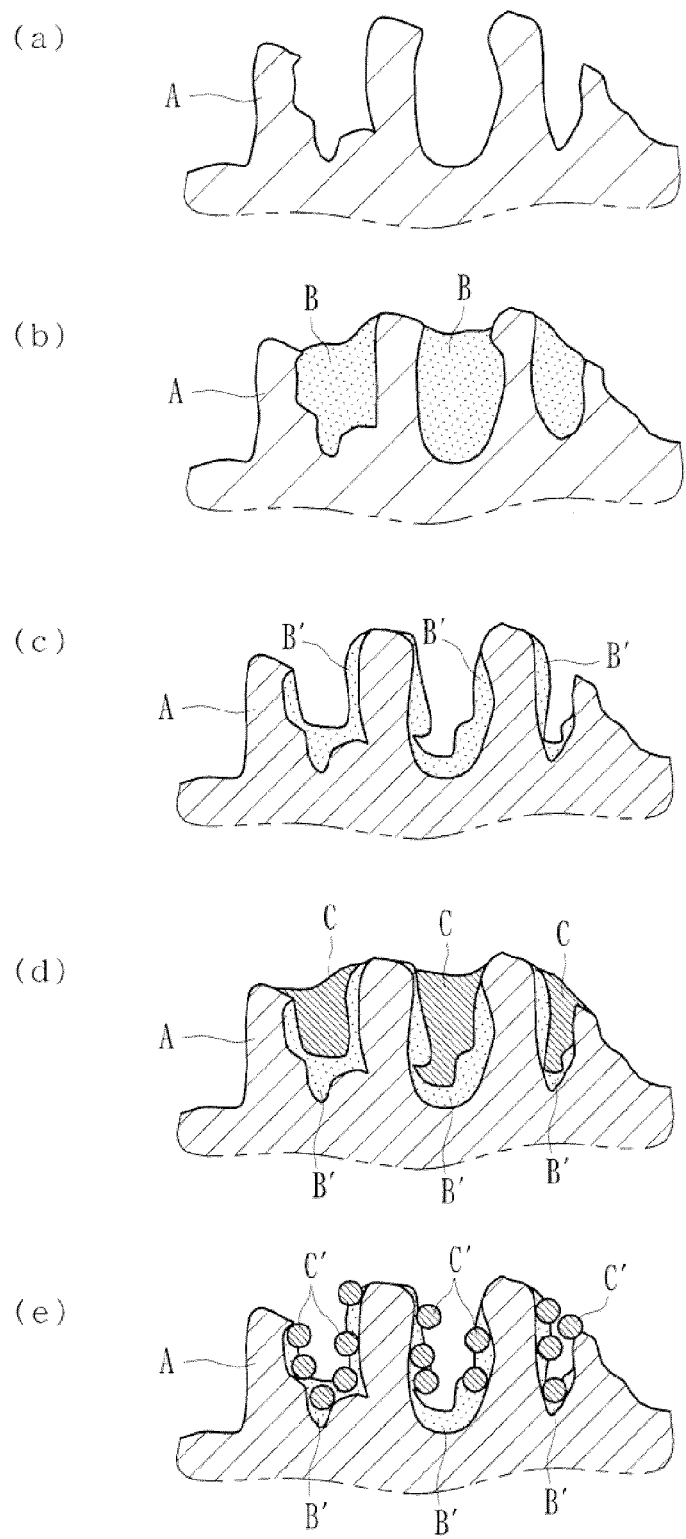
FIGS. 2A-E illustrate schematic views showing conditions in pores of embodiments of a porous alumina in each manufacturing steps of a catalyst of the present disclosure.

The second pore-filling step S5 can involve filling the pores of the porous alumina A with the aqueous solution C obtained in the second aqueous solution preparation step S4 by a pore-filling method. Again, the capillary phenomenon can be used in the pores of the porous alumina A. By this second pore-filling step S5, it is possible, as shown in FIG. 2 (d), to fill the pores of the porous alumina A formed with zirconia layers B' with the aqueous solution C including the noble metals.

The second drying and baking step S6 can involve carrying the noble metals in the pores of the porous alumina A by drying and baking the porous alumina A where the pores are filled with the aqueous solution C in the second pore-filling step S5. That is, noble metals C' can be formed on the zirconia layer B' in the pores of the alumina carrier A, as shown in FIG. 2(e), by drying the alumina carrier A after the second pore-filling step S5, and then by baking it at a temperature of 300-600° C.

The catalyst obtained through a series of the steps S1-S6 can then be supported on a sheet-like honeycomb member made of ceramics, or metals, or by wet paper-making method, to form a catalyst device used for exhaust gas purification of engines. According to the catalyst manufacturing method of the present disclosure, the pore-filling steps can be carried out two times, and zirconia layer B' and noble metals C' can be carried in pores of the alumina carrier A in each pore-filling step.

According to the present disclosure, it is possible to improve the heat resistance of the catalyst while having exhaust gas purifying characteristics best suited for various engine properties. That is, since the noble metals C' can be carried in the pores of the porous alumina A on which walls zirconia layers B' are formed, the heat resistance can be improved. In addition, since the noble metals C' can be carried in the pores after formation of the zirconia layers B' on wall surfaces of the pore through the first and second pore-filling steps S2 and S5, it is possible to efficiently form the zirconia layer B' and to simultaneously carry the noble metals. Thus exhaust gas purifying characteristics suited for various engine properties can be obtained.

Furthermore, since the noble metals in the second aqueous solution preparing step S4 can be palladium and rhodium, and can be simultaneously carried on the alumina carrier A in the second drying and baking step S6, it is possible to suppress sintering of the palladium by the rhodium while keeping high exhaust gas purifying performance. Thus durability of the catalyst can be improved. In addition, since the palladium and rhodium can be carried in the pores of the porous alumina by the pore-filling method, they can be efficiently carried in the pores and can effectively exhibit their performance as a catalyst. Accordingly, exhaust gas purifying effects can be attained without using platinum as the noble metal.

Moreover, since the weight ratio of palladium and rhodium in the aqueous solution prepared in the second aqueous solution preparation step can be about 20:1, and the content of Pd and Rh in the second pore-filling step relative to the porous alumina can be about 1-5 percentage by weight (wt. %), it is possible to effectively purify exhaust gas of two stroke-cycle engines without using platinum as the noble metal of catalyst.

Although it has been described that the noble metals in the second aqueous solution preparing step S4 can comprise palladium and rhodium, and they can be simultaneously carried on the alumina carrier in the second drying and baking step S6, these noble metals may be replaced with any other metals, such as other noble metals functioning as a catalyst. By selecting noble metals suited as a catalyst, it is possible to easily obtain desirable purifying properties suited for various engine performances.

EXAMPLES

Comparative tests and their results with respect to exhaust gas purification are described below using embodiments of the above disclosure.

Example 1

Pd, Rh, $ZrO_2$ (20 wt. %)-$Al_2O_3$

An aqueous solution was obtained by dissolving zirconyl nitrate dihydrate into purified water combined with 100 g of marketed γ-alumina powder, 54 g of zirconyl nitrate dihydrate, and 70 g of purified water(first aqueous solution preparing step). This aqueous solution was filled into pores of an alumina carrier (porous alumina) by a pore-filling method (first pore-filling step) and then baked for 5 hours at 1100° C. after having been dried for 6 hours by a drier kept at 110° C. (first drying and baking step).

Then, an aqueous solution was formed by mixing 36.4 g of a 8.5% nitric acid solution of dinitrodiammine Pd and 3.3 g of a 4.5% nitric acid Rh solution(second aqueous solution preparing step). 100 g of the alumina carrier obtained by the baking above had its pores filled by the 8.5% nitric acid solution of dinitrodiammine Pd and the nitric acid Rh solution (second pore-filling step).

Then, the catalyst having the noble metal concentration relative to the alumina carrier (catalyst carrier) of 3% Pd and 0.15% Rh was obtained by baking the alumina carrier obtained in the second pore-filling step at 600° C. for 4 hours (second drying and baking step) after drying the alumina carrier at 110° C. for 6 hours. Following, the catalyst solution was obtained by mixture-agitating the obtained catalyst with alumina sol. The finished catalyst of Example 1 was obtained by drying and baking the honeycomb member after dipping it into the catalyst solution. In this case, the amount of carried noble metals per 1 $cm^3$ of catalyst carrier (alumina carrier) was 0.0026 g (70 g/$ft^3$).

Example 2

Pd, Rh, $ZrO_2$ (20 wt. %)-$Al_2O_3$

The catalyst of Example 2 was made by same steps as those of Example 1, except that the baking temperature in the first drying and baking step was 1200° C.

Example 3

Pd, Rh, $ZrO_2$ (20 wt. %)-$Al_2O_3$

The catalyst of Example 3 was made by same steps as those of Example 1, except that the baking temperature in the first drying and baking step was 900° C.

Example 4

Pd, Rh, $ZrO_2$ (50 wt. %)-$Al_2O_3$

The catalyst of Example 4 was made by same steps as those of Example 1, except that 135 g zirconyl nitrate dihydrate was used in the first aqueous solution preparing step.

Example 5

Pd, Rh, $ZrO_2$ (5 wt. %)-$Al_2O_3$

The catalyst of Example 5 was made by same steps as those of Example 1, except that 13.5 g of the zirconyl nitrate dihydrate was used in the first aqueous solution preparing step.

Example 6

Pd, Rh, $ZrO_2$ (20 wt. %)-$Al_2O_3$

The catalyst of Example 6 was made by same steps as those of Example 1, except that 60.8 g of the 8.5% nitric acid solution of dinitrodiammine Pd and 5.5 g of the 4.5% nitric acid Rh solution were used in the second aqueous solution preparing step.

Example 7

Pd, Rh, $ZrO_2$ (20 wt. %)-$Al_2O_3$

The catalyst of Example 7 was made by same steps as those of Example 1, except that 12.2 g of the 8.5% the nitric acid solution of dinitrodiammine Pd and 1.1 g of the 4.5% nitric acid Rh solution were used in the second aqueous solution preparing step.

Comparative Example 1

Pd—$ZrO_2$(20 wt. %)-$Al_2O_3$+Rh—$ZrO_2$ (20 wt %)-$Al_2O_3$

An aqueous solution was obtained by dissolving zirconyl nitrate dihydrate into 150 ml of purified water combined with 100 g of marketed γ-alumina powder and 54 g of zirconyl nitrate dihydrate. Zirconia was carried on the alumina carrier by dipping the carrier into the solution. Then, the alumina carrier on which zirconia was carried was baked for 5 hours at 1100° C. after having been dried for 6 hours by a drier kept at 110° C.

Then, an aqueous solution was obtained by adding 70 ml of purified water into a 8.5% nitric acid solution of dinitrodiammine Pd. 50 g of the alumina carrier was obtained by the baking above and combined with 18.2 g of the 8.5% nitric acid solution of dinitrodiammine Pd. The Pd was carried on the alumina carrier by dipping the alumina carrier into the aqueous solution (impregnating method). Similarly, an aqueous solution was obtained by adding 70 ml of purified water into a 4.5% nitric acid Rh solution. 50 g of the alumina carrier obtained by the baking above was combined with 1.65 g of the 4.5% nitric acid Rh solution. The Rh was carried on the alumina carrier by dipping the alumina carrier into the aqueous solution (impregnating method).

Following, both catalysts were treated with noble metals having a concentration relative to the alumina carrier (catalyst carrier) of 3% Pd and 0.15% Rh by baking the catalysts at 600° C. for 4 hours after drying them for 6 hours. Then, a catalyst solution was obtained by mixture-agitating the obtained catalyst with alumina sol. The catalyst of Comparative Example 1 was obtained by drying and baking the honeycomb member after dipping it into the catalyst solution. In this case, the amount of carried noble metals per 1 $cm^3$ of catalyst carrier (alumina carrier) due to dipping into the catalyst solution was 0.0026 g (70 g/$ft^3$).

Comparative Example 2

Catalyst Carrier of the Prior Art

Noble metals (Pd, Rh) were carried on the catalyst carrier by adding purified water having two times the amount of noble metal solution into alumina powder and by agitating and heating it. This was mixed with 100 g of marketed γ-alumina powder, 24 g of 8.5% nitric acid solution dinitrodiammine Pd, 2.2 g of 4.5% nitric acid Rh solution, and 11.1 g of 4.5% nitric acid solution of dinitrodiammine Pd. Then, the obtained powder was baked at 600° C. for 4 hours after being dried at 110° C. for 6 hours. Then, a catalyst solution was obtained by mixture-agitating the obtained catalyst with alumina sol. The catalyst of Comparative Example 2 was obtained by drying and baking the honeycomb member after dipping it into the catalyst solution. In this case, the amount of carried noble metals per 1 cm$^3$ of catalyst carrier (alumina carrier) due to dipping into the catalyst solution was 0.0026 g (70 g/ft$^3$).

Tests

An aging test was carried out by mounting catalyst devices of honeycomb structure members made of catalysts (Examples 1-7 and Comparative Examples 1 and 2) on an exhausting system of a two stroke-cycle engine (25 cc) and running the engine at full throttle (7000 rpm) for one hour. Another honeycomb structure member on which no catalyst is carried was mounted on the exhausting system of the same engine and comparative tests were carried out with measuring exhaust gas emission (HC). The results of which are shown in a graph of FIG. 3.

Figure 3:
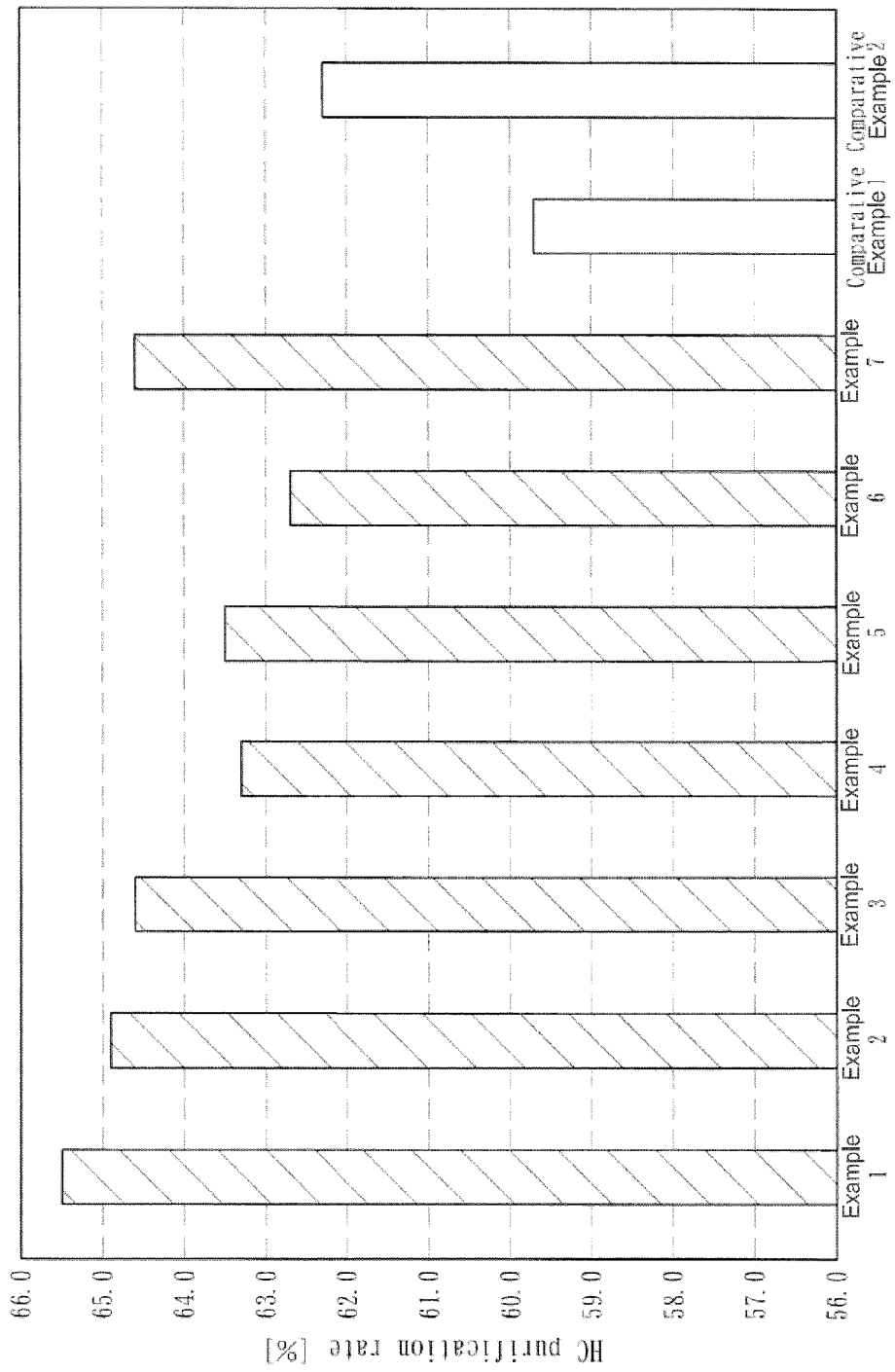
FIG. 3 illustrates a graph showing HC purification rates of Examples 1-7 and Comparative Examples 1 and 2.

As shown in the graph of FIG. 3, the HC purification rate of any one of Examples 1-7 of the present disclosure is higher than that of either the Comparative Examples 1 and 2, and Examples 1-7 have advantageous HC purification performances. As shown by comparing Example 1 with Examples 2 and 3, there is a suitable temperature for baking of the catalyst, and baking at higher temperature could detract the purification performance due to reduction of the specific surface. On the other hand, baking at lower temperature could detract the heat resistance.

Furthermore, as shown by comparing Example 1 with Examples 4 and 5, there is a suitable amount of zirconia that can be carried, and an excessive amount of zirconia could cause problems such as reduction of the volume of pores and closure of pores. On the contrary, lesser amount of carried zirconia could cause insufficient coating of zirconia layer on the pore wall. In addition, as shown by comparing Example 1 with Examples 6 and 7, there is a suitable concentration of noble metals that can be carried, and excessive concentration of the noble metals could cause reduction of purifying performance due to sintering of noble metals. On the other hand, a lesser concentration of the noble metals could also cause reduction of purifying performance due to reduction of particles of noble metals acting on the surface of the catalyst carrier (porous alumina). Furthermore, as shown by comparing Example 1 with Comparative Example 1, filling of aqueous solution by the pore-filling method can be advantageous.

The present disclosure may be applied to other types of engines than two stroke-cycle engines. The catalyst can be one in which noble metals are carried in pores of porous alumina and a method for manufacturing the catalyst can comprise a first aqueous solution preparing step for preparing aqueous solution including zirconium, a first pore-filling step for filling the pores of the porous alumina with the aqueous solution obtained in the first aqueous solution preparation step by a pore-filling method using the capillary phenomenon caused in the pores of the porous alumina, a first drying and baking step for forming a zirconia layer in the pores of the porous alumina by drying and baking the porous alumina of which pores being filled with the aqueous solution in the first pore-filling step, a second aqueous solution preparing step for preparing aqueous solution including noble metals, a second pore-filling step for filling the pores of the porous alumina with the aqueous solution obtained in the second aqueous solution preparation step by a pore-filling method using the capillary phenomenon caused in the pores of the porous alumina; and a second drying and baking step for carrying the noble metals in the pores of the porous alumina formed with zirconia layer by drying and baking the porous alumina of which pores being filled with the aqueous solution in the second pore-filling step.

What is claimed is:

1. A method for manufacturing a catalyst in which noble metals are carried in pores of porous alumina comprising:
    preparing a first aqueous solution comprising zirconium;
    filling pores of a porous alumina with the first aqueous solution by a pore-filling method using a capillary phenomenon in the pores of the porous alumina;
    drying and baking the porous alumina to form a zirconia layer in the pores of the porous alumina 900° C to 1200° C;
    preparing a second aqueous solution comprising noble metals;
    filling the pores of the porous alumina with the second aqueous solution by a pore-filling method using a capillary phenomenon in the pores of the porous alumina; and
    drying and baking the porous alumina filled with the second aqueous solution to carry the noble metals in the pores of the porous alumina.

2. A method for manufacturing a catalyst of claim 1, wherein the noble metals in the second aqueous solution comprises palladium and rhodium, and wherein the noble metals are simultaneously carried in the pores of the porous alumina.

3. A method for manufacturing a catalyst of claim 2, wherein the weight ratio of palladium and rhodium in the second aqueous solution is about 20:1, and wherein the content of palladium and rhodium in the second pore-filling step relative to the porous alumina is about 1-5 percentage by weight.

4. A method for manufacturing a catalyst of claim 1, wherein drying and baking the porous alumina for form a zirconia layer in the pores of the porous alumina is performed at 1100° C.±100° C.

5. A method for manufacturing a catalyst of claim 1, wherein dry and baking porous alumina for form a zirconia layer in the pores of the porous alumina is performed at 1100° C.

6. A method for manufacturing a catalyst of claim 1, wherein drying and baking the porous alumina filled with the second aqueous solution to carry the noble metals in the pores of the porous alumina is performed at 300-600° C.

* * * * *

UNITED STATES PATENT AND TRADEMARK OFFICE
CERTIFICATE OF CORRECTION

PATENT NO. : 9,029,288 B2  
APPLICATION NO. : 14/021909  
DATED : May 12, 2015  
INVENTOR(S) : Ryou Suzuki Page 1 of 1

It is certified that error appears in the above-identified patent and that said Letters Patent is hereby corrected as shown below:

In the Specification

In column 6 at line 16, Change "$ZrO_2(20$" to --$ZrO_2$ (20--.

In the Claims

In column 8 at line 21, In Claim 1, after "alumina" insert --at--.

In column 8 at line 44, In Claim 4, change "for" to --to--.

In column 8 at line 48, In Claim 5, change "dry" to --drying--.

In column 8 at line 48, In Claim 5, after "baking" insert --the--.

In column 8 at line 48, In Claim 5, change "for" to --to--.

Signed and Sealed this  
Twenty-sixth Day of January, 2016

Michelle K. Lee  
*Director of the United States Patent and Trademark Office*